(12) United States Patent
Kuno et al.

(10) Patent No.: US 12,247,728 B2
(45) Date of Patent: Mar. 11, 2025

(54) WIRELESS POWER FEEDING SYSTEM HAVING BATTERY MOUNTED DEVICE ENGAGED WITH POWER RECEIVING DEVICE WITH LIGHT UNIT MOUNTED DEVICE

(71) Applicants: AOI JAPAN CO., LTD., Yokohama (JP); RAISONTECH INC., Kuki (JP)

(72) Inventors: Yoshinori Kuno, Yokohama (JP); Yasushi Sekizawa, Kuki (JP); Kenji Tahara, Kuki (JP)

(73) Assignee: RAISONTECH INC., Kuki (JP)

( * ) Notice: Subject to any disclaimer, the term of this patent is extended or adjusted under 35 U.S.C. 154(b) by 440 days.

(21) Appl. No.: 17/593,918

(22) PCT Filed: Mar. 24, 2020

(86) PCT No.: PCT/JP2020/012993
§ 371 (c)(1),
(2) Date: Sep. 28, 2021

(87) PCT Pub. No.: WO2020/196508
PCT Pub. Date: Oct. 1, 2020

(65) Prior Publication Data
US 2022/0178530 A1 Jun. 9, 2022

(30) Foreign Application Priority Data
Mar. 28, 2019 (JP) .................. 2019-062924

(51) Int. Cl.
*H02J 7/00* (2006.01)
*F21V 17/10* (2006.01)
(Continued)

(52) U.S. Cl.
CPC ............ *F21V 23/06* (2013.01); *F21V 17/105* (2013.01); *F21V 23/023* (2013.01);
(Continued)

(58) Field of Classification Search
USPC ........................................................ 320/108
See application file for complete search history.

(56) References Cited

U.S. PATENT DOCUMENTS 10,944,282 B2* 3/2021 Malhotra ................. H04B 5/24
2012/0235636 A1 9/2012 Partovi
(Continued)

FOREIGN PATENT DOCUMENTS

CN 208074810 U 11/2018
EP 2945256 A2 11/2015
(Continued)

OTHER PUBLICATIONS

Search report issued on Jun. 2, 2020 by WIPO.
(Continued)

*Primary Examiner* — Samuel Berhanu
(74) *Attorney, Agent, or Firm* — Apex Juris, pllc; Tracy M Heims

(57) ABSTRACT

A composite wireless power feeding system enables a light unit to be replaced under water and includes a wireless charging system including a power feeding coil and a first power feeding circuit unit. The power feeding system includes a power reception and feeding coil, a power feeding circuit unit, a power reception circuit unit, and an energy consumption circuit unit having a power reception coil. The power feeding system includes a battery charged by electromagnetic energy induced in the power reception and feeding coil. The battery is a power source for generating electromagnetic waves in the power reception and feeding coil to induce energy in the power reception coil and thereby power the energy consumption unit.

12 Claims, 6 Drawing Sheets

(51) Int. Cl.
    *F21V 23/02*     (2006.01)
    *F21V 23/06*     (2006.01)
    *F21V 31/00*     (2006.01)
    *H02J 50/12*     (2016.01)
    *F21Y 115/10*    (2016.01)

(52) U.S. Cl.
    CPC ............ *F21V 31/005* (2013.01); *H02J 50/12* (2016.02); *F21Y 2115/10* (2016.08)

(56) References Cited

U.S. PATENT DOCUMENTS

| | | |
|---|---|---|
| 2014/0361734 A1 | 12/2014 | Yamazaki |
| 2018/0183270 A1 | 6/2018 | Nakao |
| 2018/0375384 A1 | 12/2018 | Kinoshita |

FOREIGN PATENT DOCUMENTS

| | | | |
|---|---|---|---|
| JP | 2006517778 A | | 7/2006 |
| JP | 2012502612 A | | 1/2012 |
| JP | 2013172506 A | | 9/2013 |
| JP | 2015525482 A | | 9/2015 |
| JP | 2018191508 A | * | 11/2018 |

OTHER PUBLICATIONS

Search report issued on Dec. 5, 2022 by EPO.
Search report issued on May 26, 2022.
Search report issued on Jan. 4, 2024.

* cited by examiner

WIRELESS POWER FEEDING SYSTEM HAVING BATTERY MOUNTED DEVICE ENGAGED WITH POWER RECEIVING DEVICE WITH LIGHT UNIT MOUNTED DEVICE

TECHNICAL FIELD

The present invention relates to a wireless power feeding system, and particularly, to a system that feeds power by resonant inductive coupling. Furthermore, the present invention relates to a system used for a battery-mounted light.

BACKGROUND ART

Underwater lights include an underwater light which is attached to and detached from a dedicated battery-mounted device and in which a plurality of types of lights are used in a replaceable manner.

Meanwhile, many devices based on various methods and structures have been proposed in a wireless power feeding technology. Among them, a method using electromagnetic induction is widely and generally known.

Patent Literature 1 discloses a wireless power feeding method and a power feeding system that enable expansion of use of a wider range of frequencies in wireless power feeding that can supply power over a relatively long distance by electromagnetic resonant coupling. In an electromagnetic resonant wireless power feeding method, in wireless power feeding in which a power transmission circuit of a power transmission device and a power reception circuit of a power reception device are coupled by electromagnetic resonance, the power transmission device uses two different frequency components f1 and f2 for a power source 2, a resonance frequency of the power transmission circuit is f1 and/or f2, a condition of the power transmission circuit is periodically changed to cause an electrical transient state in which a current and/or a voltage are not stable, a resonance frequency of the power reception circuit is set to (f2−f1) or (f1+f2) due to a beat phenomenon, and power at the frequency (f2−f1) or (f1+f2) is supplied to a load.

Patent Literature 2 discloses a very simple wireless power feeder using a loop coil as a power transmission device. A power transmission loop coil provided in a power transmission device extracts electric energy from a direct current (DC) power source and generates periodically changing electromagnetic resonance energy in a space. A power reception loop coil provided in a power receiver extracts periodically changing electromagnetic resonance energy as electric energy from the space and supplies power to a load. The power transmission loop coil and the power reception loop coil are coupled by electromagnetic resonance, and power is wirelessly feed from the power transmission device to the power receiver.

Patent Literature 3 discloses a wireless power feeding system including a plurality of relay devices, the wireless power feeding system suppressing a decrease in power transmission efficiency of the relay devices. The wireless power feeding system includes a power transmission device that transmits power to be fed, a plurality of relay devices that relays the power transmitted from the power transmission device, a power receiver that receives the power relayed by the relay devices, and a control device that controls the relay devices to perform power transmission through a transmission path having the highest power transmission efficiency among a plurality of transmission paths through which the power is transmitted from the power transmission device to the power receiver via the relay devices.

Patent Literature 4 discloses a technology for increasing power transmission efficiency of a magnetic resonance type wireless power feeding system. The magnetic resonance type wireless power feeding system includes an alternating current (AC) power source, a voltage conversion coil connected to the AC power source, a power-transmission-side LC circuit, a power-reception-side LC circuit, an impedance conversion coil, a load connected to the impedance conversion coil, and a transmission efficiency adjustment capacitor connected in parallel to the load. The power-transmission-side LC circuit is disposed near the voltage conversion coil and includes a power-transmission-side coil and a power-transmission-side capacitor that are excited by electromagnetic induction with the voltage conversion coil. The power-reception-side LC circuit includes a power-reception-side coil that resonates with the power-transmission-side coil and a power-reception-side capacitor. The impedance conversion coil is disposed near the power-reception-side LC circuit and excited by electromagnetic induction with the power-reception-side coil. The transmission efficiency adjustment capacitor has a capacity that improves efficiency in power transmission from the AC power source to the load.

Patent Literature 5 discloses a wireless power feeding system having high versatility and high applicability for all power reception devices. The wireless power feeding system feeds power from a power feeding stand including a power feeding unit to a power reception device on which a power reception unit is mounted in a contactless manner, and includes an intermediate member between the power feeding stand and the power reception device. Even for different power reception devices, power can be feed by a single power feeder. In addition, since the power reception device can change its arrangement during power feeding, it is possible to provide a wireless power feeding system having high versatility and high applicability.

Patent Literature 6 discloses a device that enables power to be feed from a power feeder to a power receiver even in a case where there is a mismatch in the system, structure, and shape between the power feeder and the power receiver in a wireless power feeder. It is possible to widen the range of the power receiver to which the power feeder can feed power. A detachable converter is provided between the power feeder and the power receiver. The converter functions to make a structure, size, or shape of an appearance of the power receiver from the power feeder conform with that of the power feeder by using a magnetic circuit, an electrical passive element, refeeding, or the like.

Patent Literature 7 discloses a technology of wireless power feeding in which highly efficient power transmission is performed even when the degree of coupling between a transmission coil and a reception coil is changed. The wireless power feeder includes a resonant circuit and a multi-tone power source, and transmits a power signal including any of an electric field, a magnetic field, and an electromagnetic field. The resonant circuit includes the transmission coil and a resonant capacitor connected in series. The multi-tone power source outputs a multi-tone signal obtained by overlapping sine wave signals of a plurality of frequencies to the resonant circuit.

Patent Literature 8 discloses a technology for improving power transmission efficiency in magnetic resonance type wireless power feeding. A wireless power feeder causes a capacitor and a power feeding coil to resonate, thereby causing the power feeding coil and a power reception coil to magnetically resonate. A resonance frequency at this time is defined as f. The wireless power feeder supplies AC power of the resonance frequency f to the power feeding coil by alternately turning on and off switching transistors.

Patent Literature 9 discloses a technology for efficiently controlling power fed in magnetic resonance type wireless power feeding. A wireless power feeder is a device for wirelessly feeding power from a power feeding coil to a power reception coil based on a magnetic resonance phenomenon between the power feeding coil and the power reception coil. A power transmission control circuit supplies AC power to the power feeding coil at a driving frequency. As a result, the AC power is supplied from the power feeding coil to the power reception coil. A phase detection circuit detects a phase difference between a voltage phase and a current phase of the AC power. Specifically, the phase difference is detected by comparing a first detection period in which a signal T2 is at a high level with a second detection period in which a signal S2 is at a high level and detecting a length of a period in which the first detection period and the second detection period overlap each other.

Patent Literature 10 discloses a power feeder, a power receiver, and a wireless power feeding system capable of suppressing an increase in circuit size and cost, reducing power loss, and adjusting impedance on both a power feeding side and a power reception side. The power feeder includes: a power generation unit that generates power to be fed; a power feeding element that is formed by a coil to which the power generated by the power generation unit is fed; a resonant element that is coupled by electromagnetic induction; an impedance detection unit that detects impedance on the power feeding side; a variable matching unit that has an impedance matching function at a power feeding point of the power feeding element of the power according to a control signal; a storage unit that stores impedance characteristic estimation information as a reference table; and a control unit that obtains a state to be adjusted of the variable matching unit from at least the detected impedance information and information of the reference table of the storage unit, and outputs the control signal to the variable matching unit so as to achieve the obtained state.

Patent Literature 11 discloses a technology for stabilizing a load voltage in magnetic resonance type wireless power feeding. Power is transmitted from a power feeding coil to a power reception coil by magnetic resonance. A voltage-controlled oscillator (VCO) alternately turns on and off a switching transistor Q1 and a switching transistor Q2 at a driving frequency fo, supplies AC power to the power feeding coil, and supplies AC power from the power feeding coil to the power reception coil. A phase detection circuit detects a phase difference between a current phase and a voltage phase, and the VCO adjusts the driving frequency fo so that the phase difference becomes zero. When the load voltage changes, the detected value of the voltage phase is adjusted, and as a result, the driving frequency fo is adjusted.

Patent Literature 12 discloses a power reception circuit capable of achieving a high Q factor. A wireless power receiver receives a power signal S1 including any one of an electric field, a magnetic field, and an electromagnetic field and transmitted from a wireless power feeder. A reception coil L2 is for receiving the power signal S1. A potential of a first terminal of a power storage capacitor C3 is fixed. A first switch SW1 and a second switch SW2 are sequentially connected in series so as to form a closed loop with the reception coil L2, and a connection point N1 therebetween is connected to a second terminal of the power storage capacitor C3. A third switch SW3 and a fourth switch SW4 are sequentially provided in series in a path parallel to the first switch SW1 and the second switch SW2, and a potential at a connection point N2 is fixed.

Patent Literature 13 discloses a power feeder, a power receiver, and a wireless power feeding system capable of obtaining broader band frequency characteristics in a magnetic resonance type. The power feeder includes a power generation unit that generates power to be fed, a power feeding element to which the power generated by the power generation unit is fed, and a plurality of resonant elements arranged in multiple stages and coupled to each other with a magnetic resonance relationship, and one the plurality of resonant elements is coupled by electromagnetic induction by the power feeding element.

Patent Literature 14 discloses a wireless power feeding device using a loop coil as a power transmission device. Specifically, the power transmission loop coil provided in the power transmission device extracts electric energy from a DC power source and generates periodically changing electromagnetic resonance energy in a space. A power reception loop coil provided in a power reception device extracts periodically changing electromagnetic resonance energy as electric energy from the space and supplies power to a load. The power transmission loop coil and the power reception loop coil are coupled by electromagnetic resonance, and power is wirelessly feed from the power transmission device to the power reception device.

FIG. 3 is a configuration diagram of an underwater light according to the related art. Basically, since it is not possible to replace a light in the water, it is necessary to waterproof an electrical contact of an engaging portion so that water does not enter, and it is necessary to pay attention so that moisture is not attached to the electrical contact when the light is attached or detached after floating.

A battery-mounted device is a main body in which a battery is embedded. As a light device is joined with the battery-mounted device at the engaging portion, the light can be illuminated with power of the battery of the main body. Several kinds of light devices are prepared. Examples of the light device include a spot beam light that illuminates a long distance and a wide beam light that illuminates a wide range. The degree of battery consumption is also different for each of the light devices. A connection connector connected by electrical contact is provided in the engaging portion, and the light device is screwed and firmly attached to the battery-mounted device, such that an electrical connection state is achieved. At this time, in a case where moisture such as seawater remains in the engaging portion, the life of the connection connector, a waterproof packing, or the like is shortened, and the engagement must be performed after sufficiently wiping off the moisture. The battery-mounted device includes a connector, and an AC adapter is connected to the battery-mounted device, such that the battery can be charged. A dedicated lid is prepared for the connector, and it is necessary to put the lid to waterproof the connector when the AC adapter is not connected.

CITATION LIST

Patent Literature

Patent Literature 1: JP 2017-163647 A
Patent Literature 2: JP 2017-028998 A
Patent Literature 3: JP 2017-028770 A
Patent Literature 4: JP 2014-176122 A
Patent Literature 5: JP 2014-068507 A
Patent Literature 6: JP 2013-162611 A Patent Literature 7: JP 2012-253944 A
Patent Literature 8: JP 2012-231674 A
Patent Literature 9: JP 2012-182975 A
Patent Literature 10: JP 2011-223739 A
Patent Literature 11: JP 2011-217596 A
Patent Literature 12: JP 2013-524743 T
Patent Literature 13: JP 2011-151958 A
Patent Literature 14: JP 2018-183051 A

SUMMARY OF INVENTION

Technical Problem

Some electronic devices are used with an embedded battery. When such a battery is discharged and consumed, the battery needs to be charged by being connected to a dedicated AC adapter or the like.

In a case of an underwater light in which a battery-mounted main body and a light unit are detachable, in a device exposed to water droplets such as seawater, replacement of the battery and replacement of the light cannot be performed in the water, and must be performed in a state where the water droplets are sufficiently wiped off. There arises a problem such as electric leakage from a connection connector portion and a decrease in life.

In the battery-mounted device, a role of feeding power to the light and a role of receiving power for charging the battery are required to be performed, and thus each connector portion is provided for each role. In a case where an underwater operation is assumed, a method of supplying power by wireless power feeding instead of using the connector portion is conceivable. However, a mechanism in which there are two types of connector portions for power feeding to the light and battery charging is inconvenient and causes an increase in cost.

A resonant circuit may be used for wireless power feeding. As the resonant circuit on a power feeding device side, a series resonant circuit or a parallel resonant circuit is selected. The series resonant circuit easily transmits a large amount of energy, but has a large loss. On the other hand, the parallel resonant circuit is reverse to the parallel resonant circuit. The parallel resonant circuit is used to transmit a relatively small amount of energy and has a characteristic that a stable resonance state is easily achieved.

In general wireless power feeding according to the related art, the series resonant circuit is adopted on the power feeding device side. In general, frequency adjustment is performed by detecting the resonance state. However, on the power feeding device side, a reception coil for detection is used, or switching between power feeding and reception is performed to detect the resonance state and implement the frequency adjustment. Furthermore, also on a power reception device side, the resonance state is detected and information thereon is transmitted to the power feeding device side by some communication methods (Qi standard or the like). Such a mechanism has many factors that increase costs.

An object of the present invention is to solve a problem that moisture such as seawater is attached to an electrical contact and causes a contact failure in an underwater light in which a battery-mounted main body and a light unit are detachable, and to provide a system in which the light unit can be replaced in the water and power can be supplied in an electrically non-contact state.

Solution to Problem

A wireless power feeding system according to the present invention is a composite wireless power feeding system including two wireless power feeding systems including:

a first wireless power feeding system that includes
a first power feeding coil generating electromagnetic waves,
a first power feeding circuit unit supplying power to cause the first power feeding coil to generate the electromagnetic waves,
a first power reception coil receiving the electromagnetic waves emitted from the first power feeding coil by electromagnetic induction,
a first power reception circuit unit recovering energy generated in the first power reception coil, and
a first battery storing the energy recovered by the first power reception circuit unit, and
that charges the first battery by supplying electric energy by electromagnetic induction using a phenomenon in which the first power feeding coil and the first power reception coil resonate at a predetermined resonance frequency; and a second wireless power feeding system that includes
a second power feeding coil generating electromagnetic waves,
a second power feeding circuit unit supplying power to cause the second power feeding coil to generate the electromagnetic waves,
a second power reception coil receiving the electromagnetic waves emitted from the second power feeding coil by electromagnetic induction,
a second power reception circuit unit recovering energy generated in the second power reception coil, and
an energy consumption circuit unit consuming the energy recovered by the second power reception circuit unit, and
that supplies energy to the energy consumption circuit unit by supplying electric energy by electromagnetic induction using a phenomenon in which the second power feeding coil and the second power reception coil resonate at a predetermined resonance frequency, in which the first power reception coil is configured as a wireless power reception/feeding coil that also serves as the second power feeding coil,
the first battery is used as a power source that causes the second power feeding coil to generate the electromagnetic waves,
the second power feeding circuit unit and the first power reception circuit unit are mounted on one circuit board, and configured as a power reception/feeding circuit unit in which switching between a power feeding mode and a power reception mode is performable by predetermined mode switching means,
in a case where the power feeding mode is activated by the mode switching means, the second power feeding circuit unit is activated and outputs electromagnetic waves from the wireless power reception/feeding coil toward the second power reception coil to supply energy to the energy consumption circuit unit, and
in a case where the power reception mode is activated by the mode switching means, the first power reception circuit unit is activated and recovers energy generated in the wireless power reception/feeding coil to charge the first battery by electromagnetic induction of the electromagnetic waves emitted from the first power feeding coil.

As a result, it is possible to provide a system capable of supplying power in an electrically contactless state.

In the wireless power feeding system,
the wireless power reception/feeding coil, the first battery, the power reception/feeding circuit unit, and the mode switching means are integrally configured as a battery-mounted device,
the second power reception coil, the second power reception circuit unit, and the energy consumption circuit unit are integrally configured as a terminal consumption unit,
each of a plurality of types of the terminal consumption units includes a plurality of types of the energy consumption circuit units having different functions, and is replaceable with respect to the battery-mounted device, and
the terminal consumption unit and the battery-mounted device are connected so that an electrical coupling portion is not exposed to the outside.

As a result, it is possible to perform replacement even in the water.

The energy consumption circuit unit is a circuit that converts electric energy into light, and
the terminal consumption unit is configured as a light unit having a plurality of functions.

As a result, even in the water, the plurality of light units can be replaced and used.

The wireless power feeding system further includes
an engaging portion at which the energy consumption circuit unit and the battery-mounted device are engaged so that the second power reception coil of the energy consumption circuit unit and the wireless power reception/feeding coil of the battery-mounted device are close to each other, in which
the engaging portion is an engaging portion that does not have a direct electrical coupling portion and is provided with a waterproof measure,
the power reception/feeding circuit unit further includes a control circuit, and
the control circuit detects a proximity state between the wireless power reception/feeding coil of the battery-mounted device and the second power reception coil of the energy consumption circuit unit, and continuously supplies high energy to the energy consumption circuit unit.

As a result, it is possible to supply energy without waste.

The wireless power feeding system further includes
an engaging portion at which the energy consumption circuit unit and the battery-mounted device are engaged so that the second power reception coil of the energy consumption circuit unit and the wireless power reception/feeding coil of the battery-mounted device are close to each other, in which
the engaging portion is an engaging portion that does not have a direct electrical coupling portion and is provided with a waterproof measure,
the power reception/feeding circuit unit further includes a control circuit,
the energy consumption circuit unit and the battery-mounted device are further provided with a magnet and a magnet switch, respectively, and
the control circuit detects a proximity state between the second power reception coil of the energy consumption circuit unit and the wireless power reception/feeding coil of the battery-mounted device based on an output of the magnet switch, and continuously supplies high energy to the energy consumption circuit unit based on the proximity state.

As a result, it is possible to supply energy without waste.

The battery-mounted device or the terminal consumption unit is further provided with an LED light and a small-capacity backup battery,
a light emitting unit formed of a luminous material that facilitates mutual device recognition is further provided, and
when an engaged state between the battery-mounted device and the terminal consumption unit is released, the LED light emits light for a certain period of time to facilitate replacement of the terminal consumption unit.

As a result, the terminal consumption unit can be easily replaced even in dark places.

The terminal consumption unit is a circuit that converts electric energy into light,
has a rotation portion so that a direction of the light emitted from the terminal consumption unit is freely changeable in a state in which the battery-mounted device and the terminal consumption unit are engaged with each other, and
has a function of detecting, by the second power reception circuit, a rotation direction or a rotation position of the rotation portion, and
the control circuit on the battery-mounted device side controls supply of electric energy via the wireless power reception/feeding coil according to the rotation direction or the rotation position to change an intensity or color of the light or perform switching between lighting and blinking.

As a result, it is possible to perform power output adjustment corresponding to the directivity of light.

Circuits related to the power feeding mode of the power reception/feeding circuit unit further include:
a resonant capacitor whose resonance frequency is adjusted so as to form a parallel resonant circuit in combination with the wireless power reception/feeding coil;
a switching circuit that periodically repeats activation (driving state) and deactivation (resonance state) of power supply with respect to the power feeding coil;
a frequency adjustment circuit that changes a frequency of power to be supplied to the wireless power reception/feeding coil; and
a resonance state sensor that detects a resonance state of the power feeding coil and outputs a detection signal to the frequency adjustment circuit and the control circuit,
the control circuit
integrally controls both the switching circuit and the frequency adjustment circuit,
determines a frequency and a driving time of power feeding according to information from the resonance state sensor so as to achieve an optimum resonance frequency and a stable resonance state, and controls the switch circuit and the frequency adjustment circuit according to the frequency and the driving time, and
further detects, in a case where it is determined that an abnormal resonance state or an abnormal discharge state that occurs when electromagnetic waves are output in water or salt water has occurred, heat generation by performing temperature detection, and detects an overvoltage, or an overcurrent, and in a case where it is determined that an abnormal state has occurred, the control circuit stops power feeding.

As a result, it is possible to avoid wasteful energy consumption such as electric leakage.

The mode switching means
makes the power feeding mode in a standby state be executed when the battery-mounted device and the terminal consumption unit are not engaged or an engaged state is not sensed, and performs switching from the power feeding mode in the standby state to the power reception mode when the engaged state is sensed.

As a result, it is possible to perform more smoothly switching between the power reception mode and the power feeding mode.

The mode switching means includes
the wireless power reception/feeding coil that receives the electromagnetic waves emitted from the first power feeding coil by electromagnetic induction in the power reception mode, and the first power reception circuit unit that recovers energy generated in the wireless power reception/feeding coil, and
performs switching from the power reception mode to the power feeding mode in a standby state in a case where a predetermined power reception level is not reached.

As a result, it is possible to perform more smoothly switching between the power reception mode and the power feeding mode.

Each of the wireless power reception/feeding coil of the battery-mounted device, the first power feeding coil, and the second power reception coil is a pot type ferrite core in which a cylindrical portion surrounding a winding portion, a shaft portion of the winding portion, and one bottom surface of the cylindrical portion are formed of ferrite, in the power feeding mode, the wireless power reception/feeding coil of the battery-mounted device and the second power reception coil are engaged around a core hole and are arranged so as to face each other on a side where the ferrite bottom surface is not provided, and in the power reception mode, the wireless power reception/feeding coil of the battery-mounted device and the first power feeding coil are engaged around the core hole and are arranged so as to face each other on the side where the ferrite bottom surface is not provided, and in the power reception mode or the power feeding mode, wireless power feeding continues even when rotating around the core hole.

As a result, the directivity of the magnetic flux can be enhanced.

The wireless power feeding system further includes bidirectional communication means, in which when performing wireless power reception/feeding in the power reception mode or the power feeding mode, the wireless power feeding system includes predetermined communication means that enables bidirectional data communication, a state of charge of the battery is detected by a control unit of the power reception/feeding circuit unit, and a numerical value of the state of charge is communicated to a counterpart by the communication means, and the energy consumption unit records at least an energy consumption amount, and a numerical value of the energy consumption amount is communicated to the battery-mounted device by the communication means.

As a result, it is possible to monitor the status of charge and the consumption state.

Advantageous Effects of Invention

According to the related art, it has not been possible to replace a light or a battery in an environment such as under water in a combination of a battery-mounted main body and the light. In addition, in order to charge the battery, it has been necessary to charge the battery by connecting an AC adapter to a dedicated connector. By using the wireless power feeding system of the present invention, it is possible to replace the battery-mounted main body or the light even in the water, and charging can be performed by a contactless battery power feeder having no electrical contact using a wireless power feeding connection portion between the battery-mounted main body and the light. In addition, charging can be performed even in a state in which water droplets or the like are attached, such that maintainability and product life can be increased, and furthermore, the battery-mounted main body shares a contactless electrical contact portion while feeding power to the light and receiving power when charging the battery, which contributes to low cost and convenience.

DESCRIPTION OF EMBODIMENTS

Hereinafter, best modes for implementing a system of the present invention will be described in detail with reference to the accompanying drawings.

Figure 1:
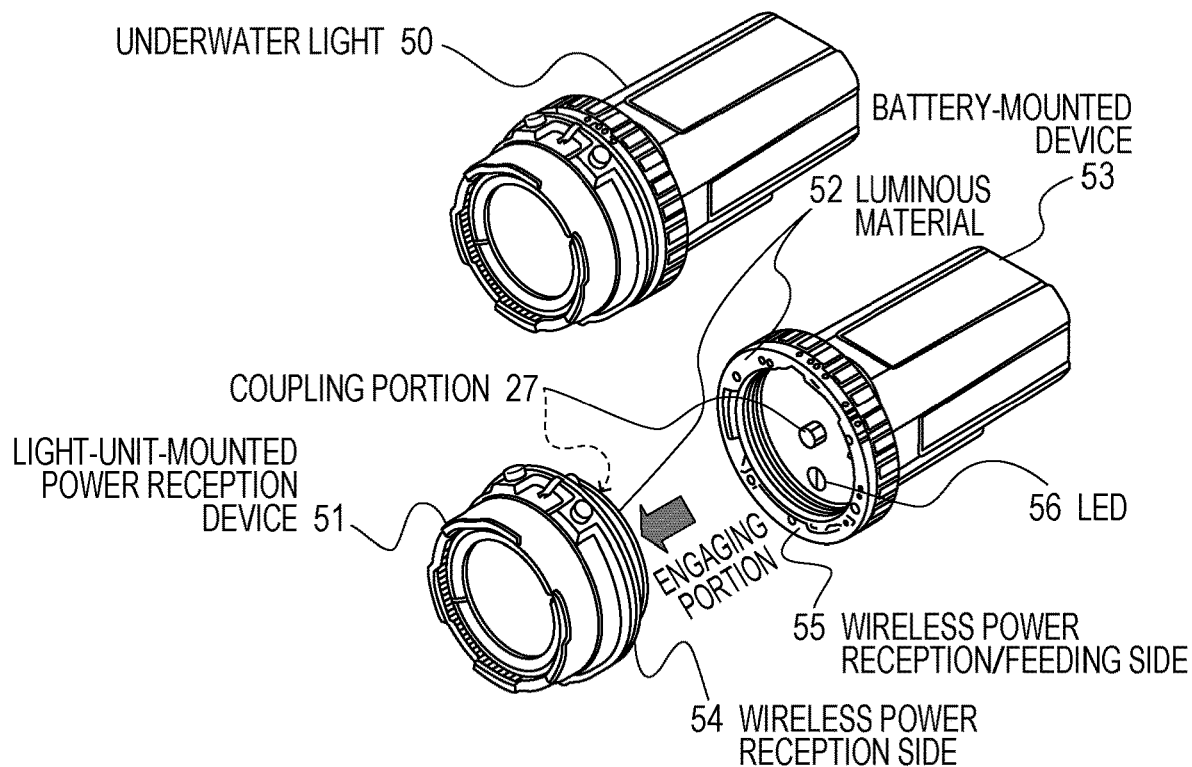
FIG. 1 is configuration diagram 1 of an underwater light.

FIG. 1 is example 1 of a configuration diagram of an underwater light. An underwater light 50 is a product that is separable and detachable between a battery-mounted device 53 and a light-unit-mounted power reception device 51. The light-unit-mounted power reception device 51 is a mechanism in which several kinds of lights are prepared and are replaced as appropriate. Conversely, when a battery of the battery-mounted device 53 is completely discharged, in a case where there is a fully charged battery-mounted device 53 separately prepared in advance, the lights can be continuously used in the water by replacement.

Figure 3:
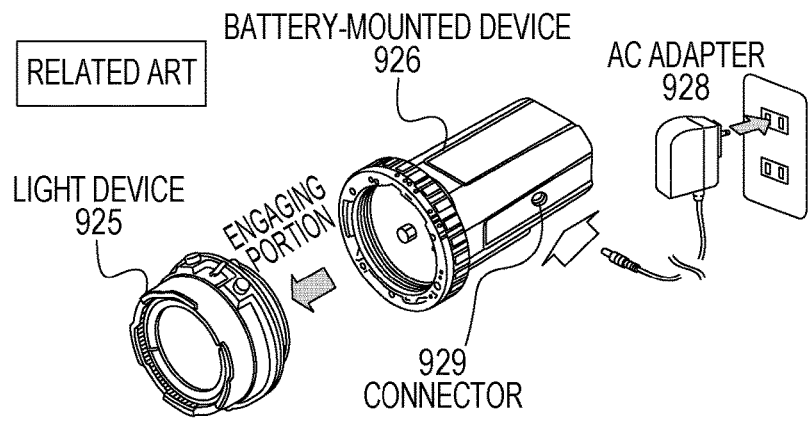
FIG. 3 is a configuration diagram of an underwater light according to the related art.

However, an underwater light according to the related art has various problems. Here, a configuration diagram of an underwater light according to the related art in FIG. 3 will be described as an example of the underwater light according to the related art.

In the underwater light according to the related art, it is necessary to take out the underwater light from the water, sufficiently wipe off moisture in an engaging portion or a connection portion, and then replace a battery-mounted device 926 and a light device 925. This is because there have been an electric leakage problem and factors that deteriorate a contact life such as conduction of a connector portion when seawater is attached and saltiness. Similarly, when a battery of the battery-mounted device 926 is charged, the battery can be charged by connecting an AC adapter 928 to a connector 929. When the connector 929 is underwater, the connector must be covered with a waterproof lid when being used. As described above, in the underwater light according to the related art, it is not possible to replace the battery-mounted device 926 and the light device 925 in a state of being exposed to water or water droplets, and maintenance of a waterproof portion is necessary and convenience is poor.

In the present invention, in order to solve this problem, a wireless power feeding mechanism is used. Furthermore, an attempt has been made to reduce the cost. This will be briefly described.

An engaging portion in configuration diagram 1 of the underwater light of FIG. 1 does not include an electrical connector. Instead, a wireless power reception/feeding coil that functions to perform wireless power feeding is embedded in a coupling portion for position alignment and a wireless power reception/feeding side 55 of the battery-mounted device 53, and a wireless power reception coil is embedded in a wireless power reception side 54 of the light-unit-mounted power reception device 51. The engaging portion and the coupling portion are mainly formed of a resin, and it is preferable to use a corrosion-resistant material.

The engaging portion in configuration diagram 1 of the underwater light of FIG. 1 includes a light emitting diode (LED) 56. When the battery-mounted device and the light device are replaced in a deep water depth by performing, for example, deep diving, those devices are normally in a dark place where sunlight does not reach. At this time, in a case where the only light goes out due to battery exhaustion, it becomes a matter of survival. Therefore, the LED is arranged in the engaging portion, such that even in a case where the battery runs out, the LED is illuminated for several minutes with a small-capacity battery to make it easy to perform replacement. Note that although the LED is installed in the engaging portion in the present embodiment, the LED may be installed anywhere in the light device instead of the engaging portion as long as the light device can be easily seen.

For example, a supercapacitor may be used as a backup battery.

In addition, in FIG. 1, a light emitting guide portion implemented by a luminous material 52 is provided at an appropriate position in the engaging portion. The luminous material is a material that emits dim light for a while even without a light source when irradiated with a certain light source. Even in a case where the backup battery of the LED of the engaging portion runs out, the light emitting guide portion in which light of the LED is accumulated emits dim light for a while, such that safety can be doubly ensured.

Further, in the present invention, for the sake of convenience, an example in which the light device is replaced is described. However, basically the same applies to a case where a spare battery-mounted device is carried and when the battery runs out, replacement with the spare battery-mounted device is performed.

Figure 2:
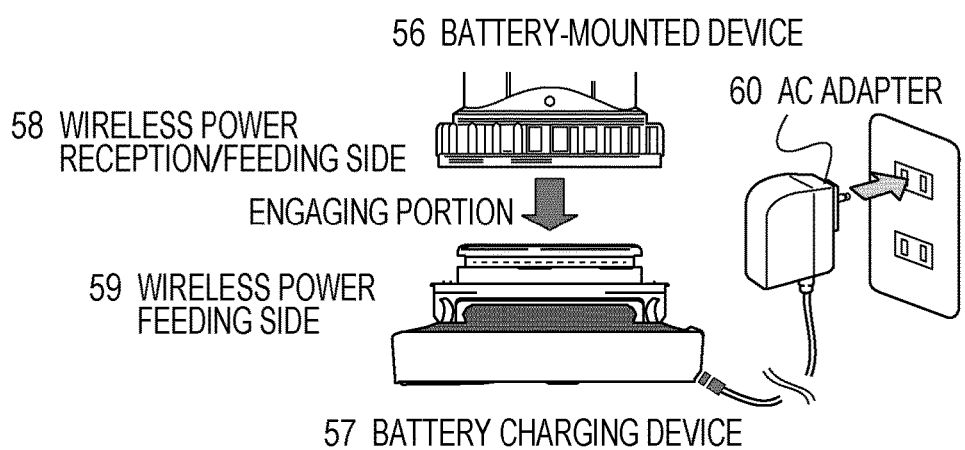
FIG. 2 is configuration diagram 2 of the underwater light.

FIG. 2 is example 2 of the configuration diagram of the underwater light. In the present invention, in a case where the battery-mounted device 53 of FIG. 1 is connected to the light-unit-mounted power reception device 51, the battery-mounted device 53 performs wireless power feeding, and in a case where a battery-mounted device 56 and a battery charging device 57 are connected to each other as in FIG. 2, the battery-mounted device 56 functions to perform wireless power reception. This eliminates the need for the battery-mounted device 56 to have a charging connector and a function thereof, which contributes to cost reduction and convenience.

Focusing on the engaging portion of FIG. 2, a wireless power reception/feeding coil that functions to perform wireless power reception is embedded in a wireless power reception/feeding side 58 of the battery-mounted device 56, and a wireless power feeding coil is embedded in a wireless power feeding side 59 of the battery charging device 57. In a case of joining with a charger, the battery charging device 57 has a structure including a protrusion by using a recess of the battery-mounted device 56. Unlike the light unit, there is no need to screw, and the battery-mounted device 56 is joined in a standing state.

The battery charging device 57 is connected to an AC adapter 60 to supply power. In the battery charging device 57, a connector portion for connection to the AC adapter 60 does not need to be particularly waterproofed.

Figure 4:
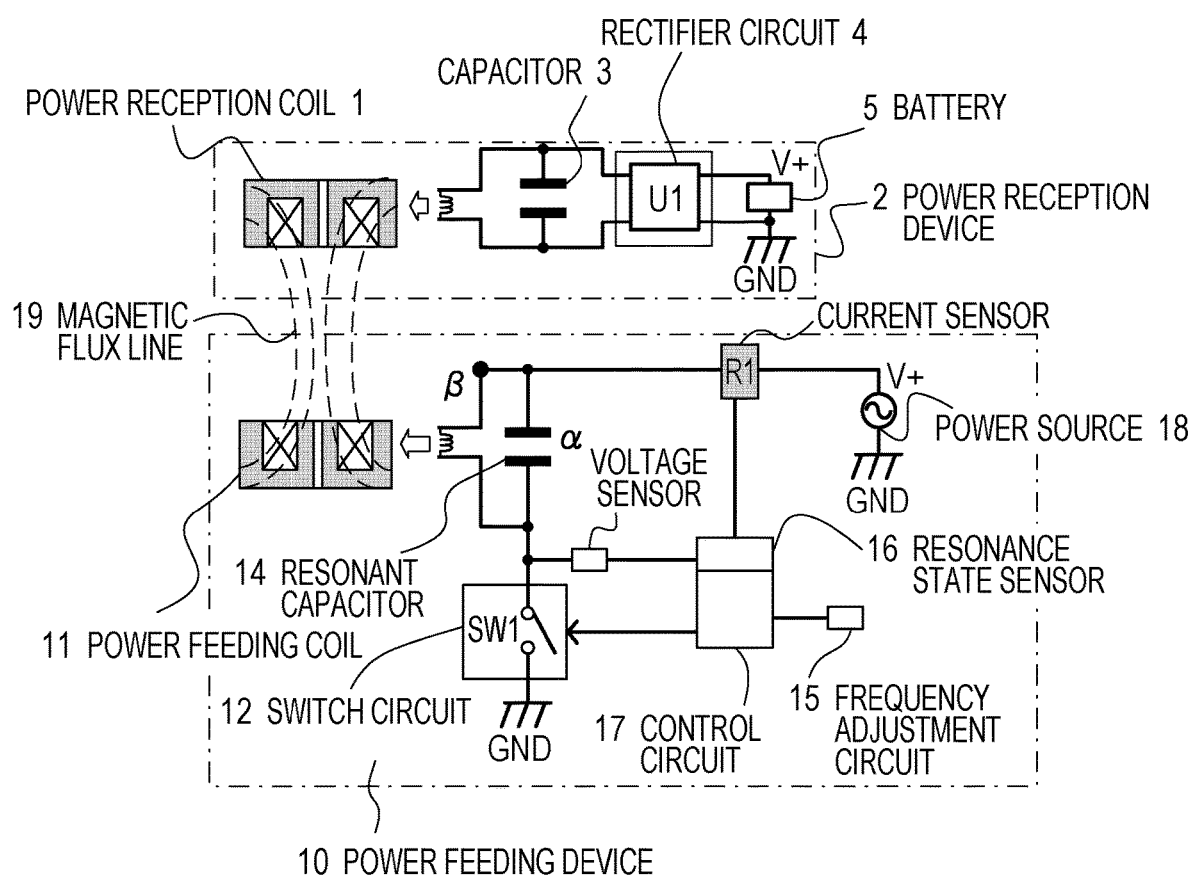
FIG. 4 is a basic circuit configuration diagram.

A power feeding device 10 of FIG. 4 includes a power feeding coil 11, a resonant capacitor 14 that constitutes a resonant circuit together with the power feeding coil 11, a switch circuit 12 for turning on and off power to the power feeding coil 11, a frequency adjustment circuit 15 (for example, a circuit that controls a capacitor) that adjusts a frequency to be supplied to the power feeding coil 11, a resonance state sensor 16 that detects a resonance state, and a power source 18. Characteristics of the power feeding device 10 will be described. First, the power feeding coil 11 and the resonant capacitor 14 constitute a parallel resonant circuit. Second, there is one switch. Third, the control circuit 17 controls the frequency adjustment circuit 15 and the switch circuit 12 to control the frequency and a power supply time. Fourth, the resonance state sensor 16 that detects the resonance state (mainly, frequency shift) is provided, and the control circuit 17 performs a control to stop power feeding in addition to the above control based on a detection result of the resonance state sensor 16.

FIG. 4 illustrates a basic circuit diagram (similar to a block diagram). In a basic circuit, the power feeding coil 11 is provided to generate electromagnetic waves and causes electromagnetic induction. At least an electric circuit of the power feeding device 10 includes the resonant capacitor 14 and the power source 18, and a resonance relationship at a constant frequency is formed with respect to a power reception coil 1 of a power reception device 2. The frequency at this time is referred to as a resonance frequency, and in general, frequencies from 100 kHz to 500 kHz are used. The resonance frequency used in the present invention is not particularly limited.

The resonance frequency slightly shifts depending on a positional relationship or state of the power reception device 2. For example, a situation changes depending on a position or inclination of the power reception coil of the power reception device 2. Therefore, when the power reception coil 1 enters a range (in a magnetic flux line illustrated in FIG. 1) covered by the electromagnetic waves transmitted from the power feeding coil 11, energy can be supplied. The power reception coil 1 entering into the magnetic flux line affects the power feeding device side in the form of resonance frequency shift. In a case where the resonance frequency shifts, the efficiency of energy supply decreases. Therefore, the shifted frequency or phase is detected by the resonance state sensor 16 (for example, a circuit including a phase detection circuit using a current sensor and a voltage sensor), and the frequency of the power feeding coil 11 is adjusted using the frequency adjustment circuit 15 according to the frequency or phase. The frequency adjustment circuit 15 is, for example, a circuit that adjusts a capacity of the capacitor.

Various elements need to be taken into account in adjusting the frequency (or phase). Therefore, it is preferable to provide the control circuit 17 that performs a control using a program by using a microcontroller (an integrated circuit including a processor, a memory, and a peripheral circuit), a programmable logic device (an integrated circuit capable of defining/changing an internal logic circuit), or the like. The control circuit 17 is connected to the resonance state sensor 16 (phase detection circuit). The resonance state sensor 16 senses frequency shift or phase shift and transmits a corresponding signal to the control circuit 17. As a result, when an object other than the predetermined power reception device 2 approaches, the resonance state sensor 16 detects an abnormal frequency or phase, and transmits a corresponding signal to the control circuit 17, such that the control circuit 17 can stop power feeding.

Furthermore, a method of detecting a temperature by using a temperature sensor connected to the microcontroller to check a heat generation state and detect an abnormality, and a method of detecting an overvoltage or an overcurrent by using voltage/current detection means and detecting an abnormality are used together, such that a safer system can be implemented.

In the power feeding device of the present invention, the resonant capacitor 14 is positioned at a position α. However, in the power feeding device according to the related art, a capacitor is connected in series to the power feeding coil, and a reference resonance frequency can be adjusted depending on a specification of the capacitor positioned at a position β. A connection method for this circuit according to the related art is generally called a series resonant circuit.

On the other hand, a parallel resonant circuit is adopted for the circuit of the power feeding device 10 of the wireless power feeding system in the present invention illustrated in FIG. 4.

In the circuit of FIG. 4, a method of detecting the resonance state without stopping power feeding to the power feeding coil 11 can be used.

The wireless power feeding system of the present invention includes the basic circuit illustrated in FIG. 4. In a case of this parallel resonant circuit, when SW1 is turned off after SW1 is turned on and a stable resonance state is achieved, the power feeding device 10 maintains the resonance state with the power reception device 2 while energy stored in the power reception coil 1 and a capacitor 3 is released. A timing at which SW1 is turned on/off is controlled using a phase locked loop (PLL) circuit. Here, the frequency adjustment circuit 15 and the control circuit 17 implement power supply with a suitable frequency based on transition of the resonance state detected by the resonance state sensor 16 connected in parallel to the power feeding coil 11. The resonance state sensor 16 is a sensor that detects the resonance state, and performs detection of transition of a voltage sensor and a current sensor, phase detection of the resonance frequency, and the like.

In the circuit of FIG. 4, it is difficult to clearly know the phase shift of the resonance frequency of the power reception device 2. However, by simulating various situations obtained from the resonance state sensor 16 in advance and performing programming based thereon, it is possible to perform processing of making a simple determination as to whether to increase, decrease, or maintain the resonance frequency. Then, by further detecting transition of a result after the adjustment, it is possible to determine whether or not it is appropriate, and perform a control by trial and error.

Figure 5:
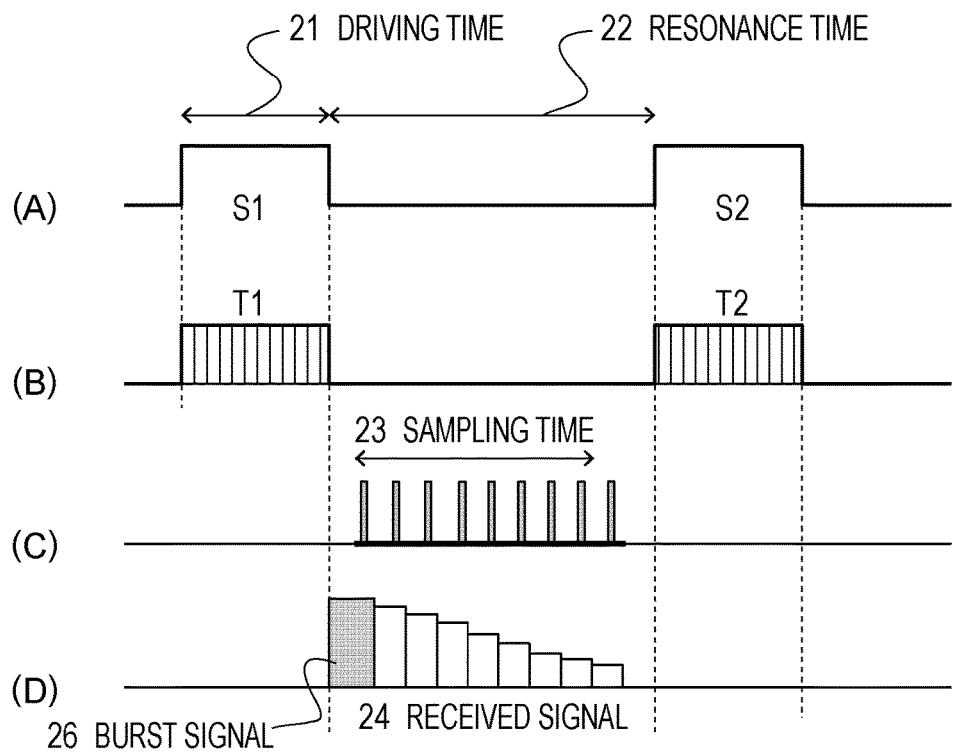
FIG. 5 is a schematic diagram of a basic signal waveform.

FIG. 5 is a schematic diagram of a signal waveform of the basic circuit of the power feeding device 10 of FIG. 4. FIG. 5(A) illustrates a waveform of the switch circuit 12 of FIG. 4, and the switch circuit 12 is switched on when the waveform is at a high level. That is, during a time during which the switch circuit 12 is switched on, the power source 18 supplies power. Therefore, the time during which the switch circuit 12 is switched on is a driving state, that is, a driving time. A time during which the switch is turned off and driving is not performed is a resonance state, that is, a resonance time.

As illustrated in FIG. 4, in a case where the power feeding coil 11 and the resonant capacitor 14 constitute a parallel resonant circuit, energy is continuously supplied as long as the power feeding device 10 is in the resonance state with the power reception device 2, in both the driving state and the resonance state.

FIG. 5(B) illustrates a drive signal. When the switch circuit 12 is turned on, the power source 18 is turned on. FIG. 5(C) illustrates a sampling signal detected by the resonance state sensor 16 of FIG. 1, and detection (sampling) is performed by making the signal be in an ON state a plurality of times in a sampling time.

FIG. 5(D) illustrates a received signal input to the resonance state sensor 16 of FIG. 1. This signal indicates a state of the power feeding coil 11 in the resonance state. Although this signal waveform is illustrated in a simplified manner, this signal waveform is a signal having a frequency characteristic, and it is also possible to measure a frequency component. The signal is mainly converted as a voltage into a digital value by an analog-digital (AD) conversion circuit or the like to transmit information to the control circuit 17 of FIG. 4.

In the resonance time illustrated in FIG. 5(A), when the energy in the power feeding coil 11 and the resonant capacitor 14 is supplied to the power reception device 2, a signal intensity (voltage) decreases as illustrated in FIG. 5(D). Based on this transition, it is possible to simulate whether or not resonance is appropriately performed. In addition, a phase difference can be detected as the frequency characteristic. There is a slight difference between when the power feeding device 10 resonates with the power reception device 2 and when the power feeding device does not resonate with the power reception device 2. By comprehensively considering these, the control circuit 17 adjusts the frequency at the time of power supply in cooperation with the frequency adjustment circuit 15. Sometimes, the frequency is intentionally shifted back and forth to check a change of the state of FIG. 5(D). In addition, in a case of being in the resonance state with the power reception device 2, the control circuit 17 also adjusts the driving time in consideration of how the voltage decreases in FIG. 5(D).

Note that the detection performed by the resonance state sensor 16 in FIG. 5(C) may be accompanied by energy loss in the power feeding device 10. Therefore, it is sufficient to suppress the energy loss by intermittently performing sampling, for example, once per second without performing sampling every time.

In addition, specifications of the power source 18, the power feeding coil 11, and the resonance frequency are determined according to the magnitude of energy to be transmitted or the size or height of an area to which power is to be fed. The resonant capacitor 14 is mainly determined according to the specification of the reference resonance frequency. These configurations implement an advanced electric circuit obtained by repeatedly performing complex simulation in actual implementation.

As described above, since a programmable circuit such as a microcontroller or a programmable logic device is used for the control circuit 17, it is possible to find an appropriate program by repeatedly performing the simulation and perform a control according to the program.

The circuit of the power reception device 2 includes a predetermined power reception coil 1, and includes at least the capacitor 3 and a rectifier circuit 4. Note that the capacitor 3 may be connected to the power reception coil 1 in series or in parallel. In the present invention, it is ideal to connect the capacitor 3 to the power reception coil 1 in parallel. An internal battery 5 is embedded in the power reception device 2. The internal battery 5 is a rechargeable secondary battery. A supercapacitor (electric double-layer capacitor) may be used instead of the secondary battery.

Specifications or volumes of the power reception coil 1 and the resonance frequency at this time are set according to the magnitude of the energy to be received, but designing can also be performed to prioritize the volume to be stored in the power reception device 2.

When electromagnetic induction at a predetermined resonance frequency is caused from the power feeding coil 11 of the power feeding device 10, a magnetic flux is generated as indicated by a magnetic flux line of FIG. 4. When the power reception coil 1 of the power reception device 2 enters an end of the magnetic flux line, electric energy is generated by an electromotive force caused by the electromagnetic induction. This energy is recovered and stored in the internal battery 5.

In a case of a general existing wireless power feeding device, the power reception device 2 often includes a frequency detection circuit and communication means that notifies of a state of the power reception device 2 and performs communication with the power feeding device 10. Transmission to the power feeding device 10 is performed by the communication means, and the power feeding device 10 has a mechanism that appropriately adjusts the resonance frequency. In this case, the power reception device 10 requires a predetermined IC circuit.

On the other hand, in the present invention, the circuit of the power reception device 2 is configured by a mechanism that is extremely simplified. With this simplified configuration, it is possible to perform discharging while performing charging, and thus, it is possible to perform charging by the wireless power feeding system and simultaneously discharge and supply power to an electronic device in a state in which a charger is attached inside the electronic device.

Figure 6:
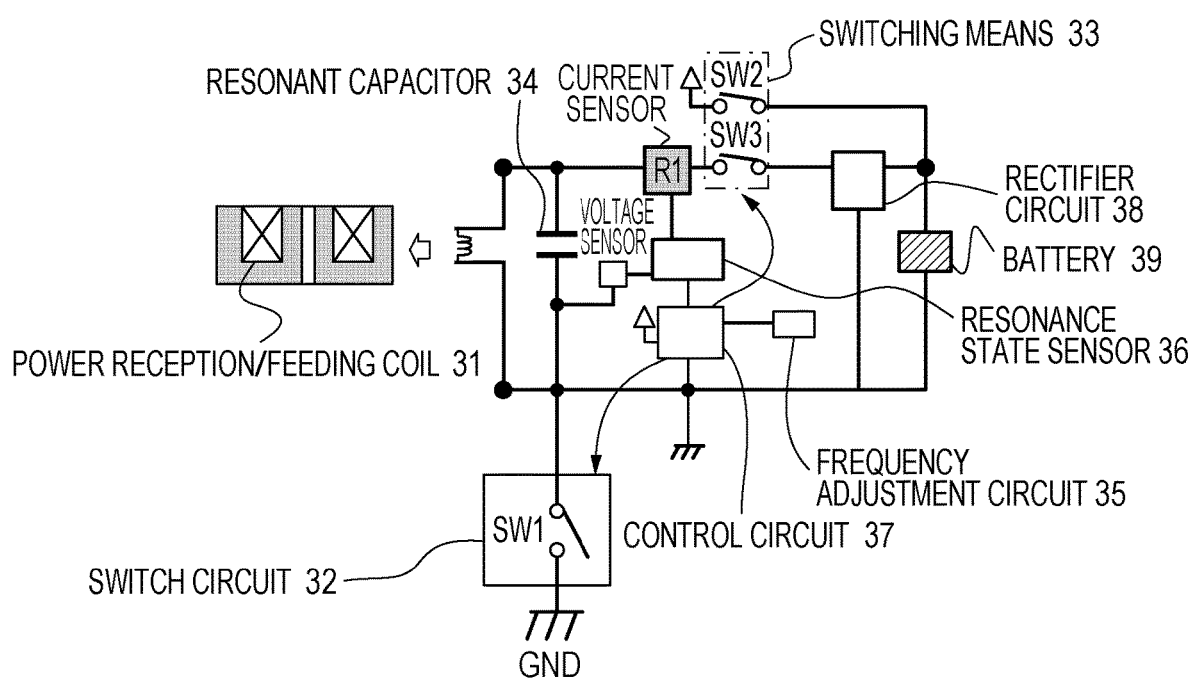
FIG. 6 is an explanatory diagram of a wireless power reception/feeding circuit in which a power feeding unit and a power reception unit are integrated.

FIG. 6 is an explanatory circuit diagram in which there is one power feeding unit and one power reception unit.

The wireless power feeding system of the battery-mounted device of the present invention is a wireless power reception/feeding coil in which a wireless power feeding coil and a wireless power reception coil are integrated.

A power feeding circuit unit and a power reception circuit unit are power reception/feeding circuit units mounted on one circuit board. The power reception/feeding circuit unit is configured to enable switching between a power feeding mode and a power reception mode by predetermined switching means.

The power reception coil 1 and the power feeding coil 11 illustrated in FIG. 4 are shared by one power reception/feeding coil 31. In addition, it is characterized in that the power reception/feeding coil 31 is a power reception/feeding circuit in which the circuit unit of the power reception device 2 and the circuit unit of the power feeding device 10 are integrated.

The power reception/feeding coil 31 is a circuit using the parallel resonant circuit proposed in the present invention, and the resonant capacitor 34 is connected in parallel to the coil.

Here, a state of the circuit in the power feeding mode in which power is fed will be described. In the power feeding mode, a switch SW2 of the switching means 33 is turned on, power is supplied from the battery, and a switch SW3 is turned off. In a case of this parallel resonant circuit, when SW1 is turned off after SW1 is turned on and a stable resonance state is achieved, the resonance state with the power reception device is maintained while energy stored in the power reception/feeding coil 31 and the capacitor 34 is released. Here, a frequency adjustment circuit 35 and a control circuit 37 implement power supply with a suitable frequency based on transition of the resonance state detected by a resonance state sensor 36 connected in parallel to the power reception/feeding coil 31. The resonance state sensor 36 is a sensor that detects the resonance state, and performs detection of transition of a voltage/current, phase detection of the resonance frequency, and the like.

Here, a state of the circuit in the power reception mode in which power is received will be described. In a case of the power reception mode, the switch SW2 of the switching means 33 is turned off, and the switch SW3 is turned on. In addition, SW1 is turned off. The power reception/feeding coil 31 generates electric energy by an electromotive force caused by the electromagnetic induction. This energy passes through a rectifier circuit 38 to charge a battery 39.

In this manner, by operating SW1, SW2, and SW3 by the control circuit 37 that controls the switches, it is possible to provide means for switching between the power feeding mode and the power reception mode.

Figure 7:
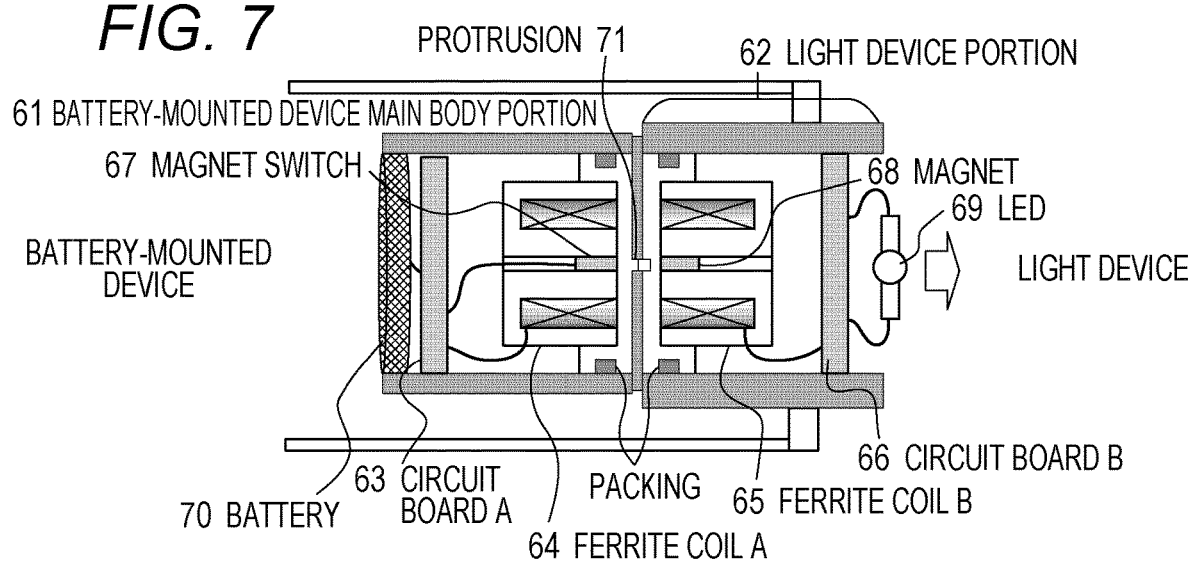
FIG. 7 is a cross-sectional view of a connection portion between a battery-mounted device and a light device.

FIG. 7 is a cross-sectional view of a connection portion between the battery-mounted device and the light device.

A battery-mounted device main body portion 61 includes a ferrite coil A 64 and is connected to a circuit board A 63. Here, the circuit board A 63 is a board on which the wireless power reception/feeding circuit illustrated of FIG. 6 is mounted. A battery 70 is connected to the circuit board A 63. The ferrite coil A 64 is also referred to as a wireless power reception/feeding coil.

The light device portion 62 includes a ferrite coil B 65 and is connected to a circuit board B 66. Here, the circuit board A 63 is a board on which the wireless power reception/feeding circuit illustrated of FIG. 6 is mounted. The circuit board B 66 is connected to an LED 69 which is a light.

The connection portion between the battery-mounted device and the light device of FIG. 7 has a protrusion 71. FIG. 7 illustrates a mechanism in which the battery-mounted device main body portion 61 has a protruding shape, and the light device portion 62 has a recessed shape, and the battery-mounted device main body portion 61 and the light device portion 62 are engaged. For a waterproof measure, a packing or the like is provided, the entire engaging portion of the battery-mounted device main body portion has a recessed shape, and the entire engaging portion of the light device portion 62 has a protruding shape. That is, a protruding portion of the light device portion 62 is engaged with a recessed portion of the battery-mounted device main body portion 61 in such a manner as to be fitted or screwed based on the protrusion 71.

The ferrite coil A 64 and the ferrite coil B 65 are arranged to face each other across a case.

In FIG. 7, in order to detect whether or not the battery-mounted device main body portion 61 and the light device portion 62 are in an engaged state, the battery-mounted device main body portion 61 includes a magnet switch 67, and the light device portion 62 includes a magnet 68. When engaged, the magnet switch 67 is turned on by the magnet 68, and acts on the circuit board A 63.

When the battery-mounted device main body portion 61 and the light device portion 62 are in the engaged state, in wireless power feeding, the wireless power feeding efficiency is constant even when the light device portion 62 is rotated about the protrusion 71. Therefore, in a case where a function of detecting a rotational position when the light device portion 62 is rotated is provided, it is possible to provide a function of changing the intensity of the light depending on a rotation direction.

Furthermore, it is also possible to change the color of the light or perform switching between lighting and blinking instead of changing the intensity of the light. Since several types of lights can be replaced on site, it is possible to perform a change to a light for an appropriate use and further implements multiple functions.

The purpose of the detection of the engaged state is to stop wireless power feeding when not engaged to thereby suppress the consumption of the battery. In addition, basically, in a case where there is no electric leak as a result of the above-described abnormality detection, but a combination of seawater and metal has caused long-time exposure to electromagnetic waves, the metal may cause abnormal heat generation, and it is thus preferable to provide this switch mechanism.

However, a method of not using the magnet switch is also disclosed in the present invention, and will be described later.

Figure 8:
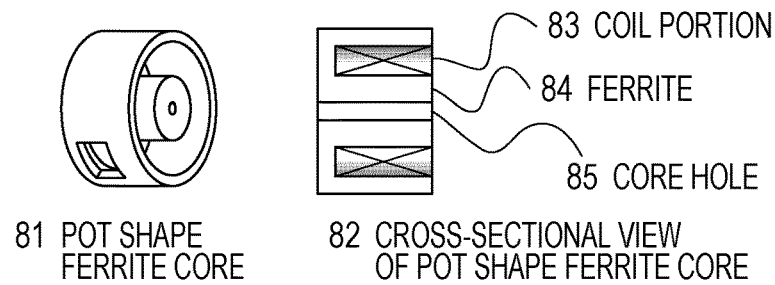
FIG. 8 is a configuration diagram of a ferrite coil.

FIG. 8 is a configuration diagram of the ferrite coil. In the present invention, the ferrite coils A and B of FIG. 7 intentionally use a pot type ferrite core 81. The core has a structure that prevents magnetic flux from leaking to the outside of the pot shape, and it is possible to further suppress leakage magnetic flux even when the core is exposed to a conducting environment (metal or seawater). When the leakage magnetic flux is suppressed, the power feeding efficiency is increased, and safety is enhanced. In addition, at the time of wireless power feeding, a coil portion 83 may generate some heat, but the pot type ferrite core has a more excellent heat dissipation effect as compared with ferrite cores having other shapes.

As illustrated in a schematic view of the pot type ferrite core 81, the pot type ferrite core 81 includes the coil portion 83 wound by an electric cable, a ferrite 84, and a core hole 85 when a hole is formed at the center.

Figure 9:
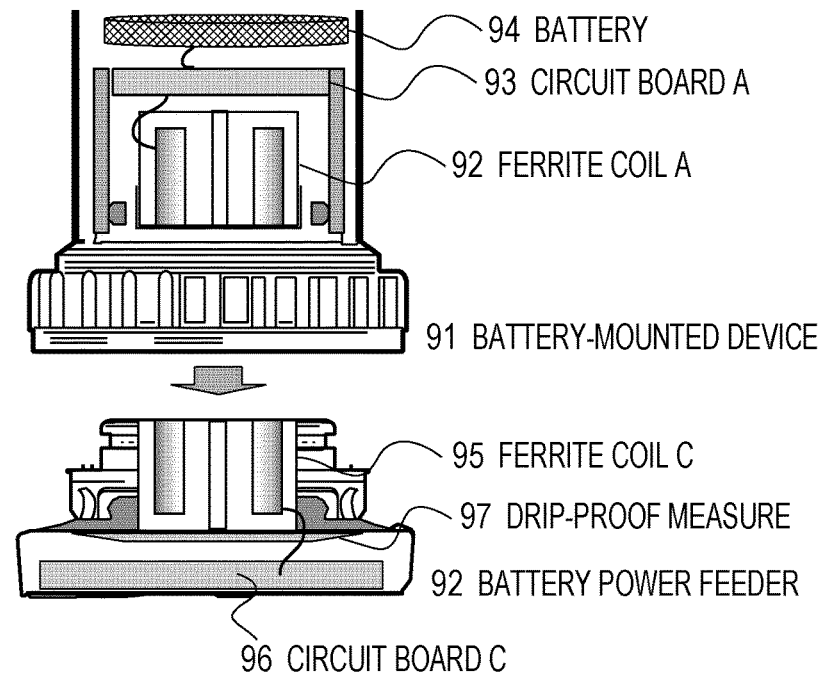
FIG. 9 is a cross-sectional view of a connection portion between a battery-mounted device and a battery charging device.

FIG. 9 is a cross-sectional view of a connection portion between a battery-mounted device and a battery charging device.

A battery-mounted device 91 includes a ferrite coil A 92 and is connected to a circuit board A 93. The circuit board A 93 is connected to a battery 94. The ferrite coil A 92 is also referred to as a wireless power reception/feeding coil.

A battery power feeding device 92 includes a ferrite coil C 95 and is connected to a circuit board C 96. The circuit board C 96 is supplied with power from an AC adapter or the like.

The battery power feeding device 92 has a mechanism of a drip-proof measure 97 on the assumption that charging is performed in a state in which water droplets are attached to the battery-mounted device 91.

The drip-proof measure 97 is a case of the battery power feeding device 92 that is formed of a sponge-like material absorbing water droplets and has an air hole for natural evaporation. Another method of the drip-proof measure 97 may include a mechanism in which water droplets attached to the battery-mounted device 91 are pushed out when the battery-mounted device 91 is joined, and the water droplets flow to the dish-shaped drip-proof measure 97. In the dish-shaped drip-proof measure 97, a hole for releasing water droplets is provided in the case of the battery-mounted device 91.

Figure 10:
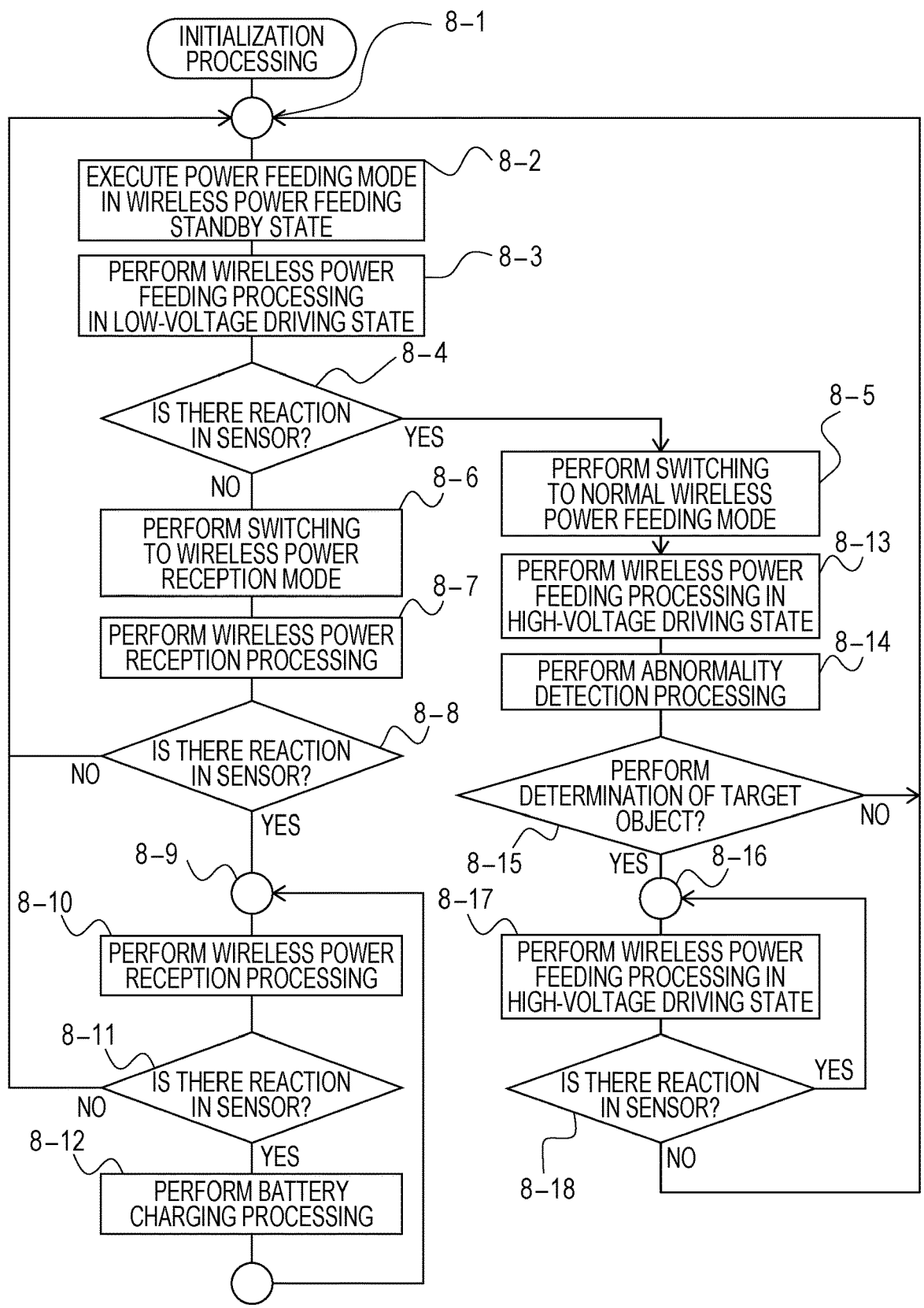
FIG. 10 is a processing flowchart of a battery-mounted main body portion.

FIG. 10 is a processing flowchart of a battery-mounted main body. The battery-mounted main body processes both functions of wireless power feeding and wireless power reception with the same coil and circuit. This will be described in order.

Initialization processing includes various types of processing performed when a power source is turned on. 8-2 denotes processing of performing switching to the power feeding mode in a wireless power feeding standby state. At this time, wireless power feeding processing in a low-voltage driving state is performed (8-3). In this state, for example, a power feeding voltage itself is lowered, and processing of increasing a time during which power feeding is not performed and intermittently performing power feeding to suppress the power consumption is performed. Once power is fed, depending on whether or not there is a power reception side of the light device, it is determined whether or not a threshold value or more is reached according to the presence or absence of a reaction 8-4 of the sensor based on the detection performed by the resonance state sensor 16. In a case where there is no reaction in the sensor, switching to the wireless power reception mode is performed (8-6). Next, wireless power reception processing of 8-7 is performed. It is determined whether or not a threshold value or more is reached according to the presence or absence of a response 8-8 in the sensor based on the detection performed by the resonance state sensor 16.

The following processing is repeatedly performed. Wireless power reception processing of 8-10 is performed, and determination is made according to the presence or absence of a reaction 8-11 in the sensor. Then, in a case where stable power reception is performed according to the reaction in the sensor, battery power reception processing is performed in 8-12. Returning to 8-9, as long as there is a reaction in the sensor, the processing is repeatedly performed. In a case where there is no reaction in the sensor, the processing returns to 8-1.

In a case where there is a reaction in the sensor in 8-4, switching to the normal power feeding mode is performed in 8-5. In 8-13, wireless power feeding processing is performed in a high-voltage driving state. In 8-14, predetermined abnormality detection processing is performed. In a case where a result of the abnormality detection (8-15) indicates that wireless power feeding to a target object is performed, the processing proceeds to 8-16, and otherwise, the processing returns to 8-1. In a case where the target object is normal, the wireless power feeding processing is performed in the high-voltage driving state in 8-17. Then, in a case where there is no reaction in the sensor, the processing returns to 8-1, and in a case where there is a reaction, the processing returns to 8-16 and is repeatedly performed.

In this way, the mechanism of switching of the wireless power reception/feeding mode of the battery-mounted main body has been described with reference to the flowchart.

Figure 11:
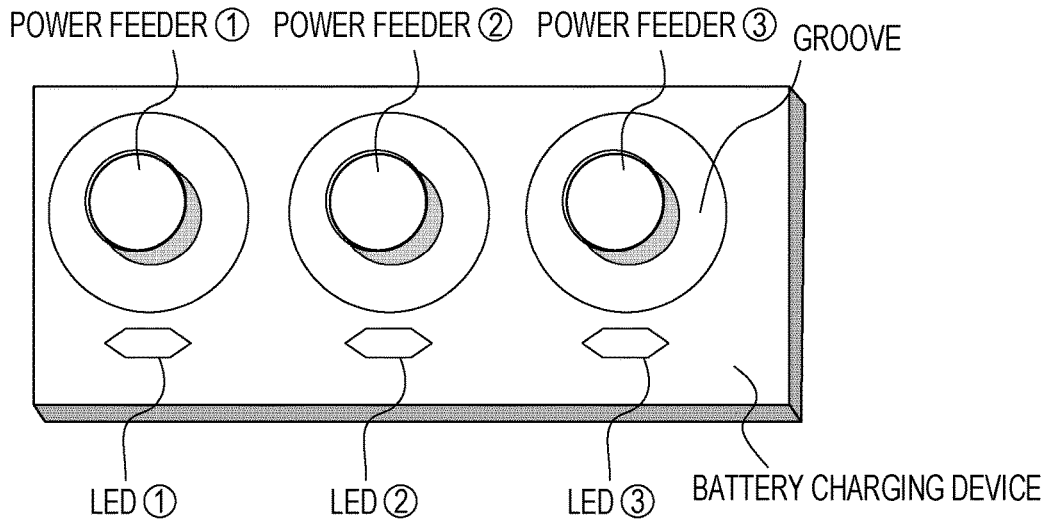
FIG. 11 illustrates the battery charging device.

FIG. 11 is a diagram of an example of the battery charging device. This battery charging device includes three battery feeders described in FIG. 9. As described above, the battery charging device is a charging device capable of simultaneously performing battery charging for three battery-mounted main bodies. Each power feeder includes an LED status indicator indicating a power feeding state. In addition, each power feeder portion has a groove, and the groove is provided with a waterproof measure, and has a mechanism in which water droplets and the like are absorbed and discharged during power feeding.

Figure 12:
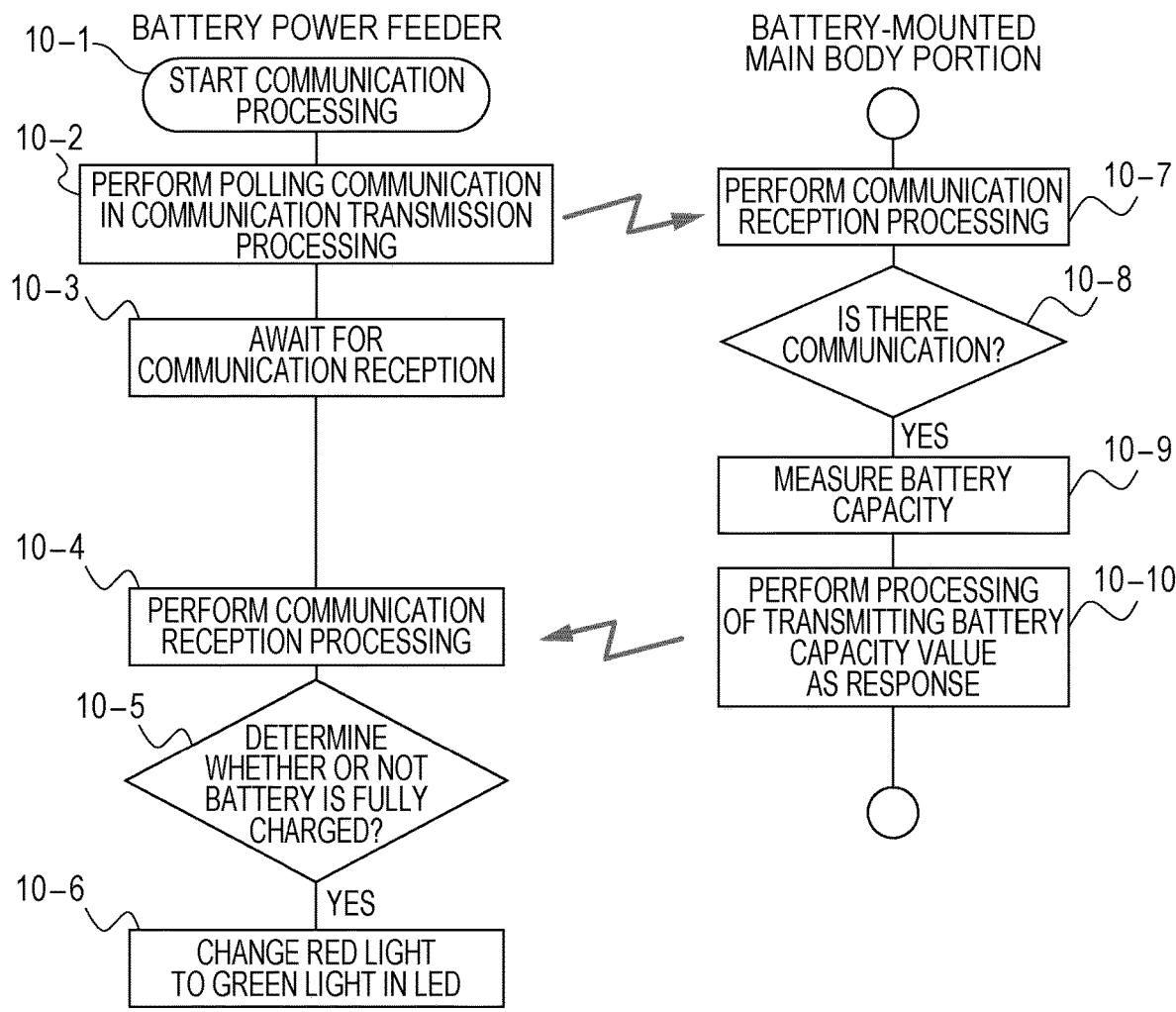
FIG. 12 is a flowchart of an example of communication processing.

FIG. 12 is a flowchart of an example of communication processing. When wireless power feeding and wireless power reception are performed, communication processing can be performed by a predetermined method.

This method will be described below. Here, steps thereof will be sequentially described with reference to the flowchart.

In the battery power feeder, the communication processing is started in 10-1. Here, processing of storing a communication content in a memory is mainly performed. Next, in 10-2, communication transmission processing is performed. In the communication transmission, polling communication is performed. Next, in 10-3, communication reception is awaited. Since a response value is returned when communication is established, reception is awaited for a certain period of time. Next, in a case where the response value is returned, communication reception processing is performed in 10-4. For example, in a case where the value indicates the state of charge as a battery capacity, full-charge determination processing is performed in 10-5. Here, in a case where it is determined that the battery is fully charged, for example, the LED or the like of FIG. 11 is changed from red light to green light.

Next, the battery-mounted main body will be described. Communication reception processing of receiving the communication content transmitted from the communication processing of 10-2 is performed in 10-7. In a case where it is determined in 10-8 that there is communication, the battery capacity is measured, processing of returning a battery capacity value as a response is performed in 10-10 to transmit the battery capacity value as a response.

This communication means can further have various functions by bidirectional communication. For example, when the light-unit-mounted power reception device includes means that records a light emission amount, and the battery-mounted main body and the light unit are coupled to perform wireless power feeding, a numerical value of the light emission amount can be received by the communication means and stored in the memory of the battery-mounted main body.

Here, a manner in which the communication processing is performed will be briefly described. There are various communication methods. For example, the communication can be performed by simple radiocommunication, and in a case where, in the received signal 24 indicated by the basic signal waveform in FIG. 5, the first received signal is a burst signal 26 and the second and subsequent received signals have binary signal values, a reaction for a case where there is a received signal can be made when the binary signal value is 1, and a reaction for a case where there is no received signal can be made when the binary signal value is 0, data can be transmitted while performing wireless power feeding although the speed is very low. In addition, as a generally adopted case, there is also a method in which another communication means, for example, a function such as a radio frequency identifier (RFID) is separately provided, and communication is occasionally performed.

INDUSTRIAL APPLICABILITY

The wireless power feeding system of the present invention is particularly suitable for an underwater camera. Further, the present invention can be applied not only to an underwater environment, but also to an environment with a lot of dust and a safety-conscious product handled by children. A destination to which the battery-mounted main body is connected can be, for example, a light whose rotation direction is desired to be freely set, and is not limited to the light, and any destination (energy consumption circuit unit) to which power is desired to be supplied can be applied.

REFERENCE SIGNS LIST

1 Power reception coil
2 Power reception device
10 Power feeding device
11 Power feeding coil
12 Switch circuit
14 Resonant capacitor
15 Frequency adjustment circuit
16 Resonance state sensor
17 Control circuit
18 Power source

FIG. 1

50 UNDERWATER LIGHT
51 LIGHT-UNIT-MOUNTED POWER RECEPTION DEVICE
53 BATTERY-MOUNTED DEVICE
52 LUMINOUS MATERIAL
27 COUPLING PORTION
ENGAGING PORTION
55 WIRELESS POWER RECEPTION/FEEDING SIDE
54 WIRELESS POWER RECEPTION SIDE

FIG. 2

56 BATTERY-MOUNTED DEVICE
58 WIRELESS POWER RECEPTION/FEEDING SIDE
59 WIRELESS POWER FEEDING SIDE
ENGAGING PORTION
57 BATTERY CHARGING DEVICE
60 AC ADAPTER

FIG. 3

RELATED ART
925 LIGHT DEVICE
ENGAGING PORTION
926 BATTERY-MOUNTED DEVICE
929 CONNECTOR
928 AC ADAPTER

FIG. 4

1 POWER RECEPTION COIL
3 CAPACITOR
4 RECTIFIER CIRCUIT
5 BATTERY
2 POWER RECEPTION DEVICE

19 MAGNETIC FLUX LINE
CURRENT SENSOR
14 RESONANT CAPACITOR
11 POWER FEEDING COIL
12 SWITCH CIRCUIT
VOLTAGE SENSOR
18 POWER SOURCE
16 RESONANCE STATE SENSOR
17 CONTROL CIRCUIT
15 FREQUENCY ADJUSTMENT CIRCUIT
10 POWER FEEDING DEVICE

FIG. 5

21 DRIVING TIME
22 RESONANCE TIME
23 SAMPLING TIME
24 RECEIVED SIGNAL
26 BURST SIGNAL

FIG. 6

34 RESONANT CAPACITOR
33 SWITCHING MEANS
CURRENT SENSOR
VOLTAGE SENSOR
31 POWER RECEPTION/FEEDING COIL
32 SWITCH CIRCUIT
38 RECTIFIER CIRCUIT
39 BATTERY
36 RESONANCE STATE SENSOR
35 FREQUENCY ADJUSTMENT CIRCUIT
37 CONTROL CIRCUIT

FIG. 7

71 PROTRUSION
62 LIGHT DEVICE PORTION
61 BATTERY-MOUNTED DEVICE MAIN BODY PORTION
67 MAGNET SWITCH
BATTERY-MOUNTED DEVICE
PACKING
68 MAGNET
LIGHT DEVICE
70 BATTERY
63 CIRCUIT BOARD A
64 FERRITE COIL A
65 FERRITE COIL B
66 CIRCUIT BOARD B

FIG. 8

81 POT SHAPE FERRITE CORE
82 CROSS-SECTIONAL VIEW OF POT SHAPE FERRITE CORE
83 COIL PORTION
84 FERRITE
85 CORE HOLE

FIG. 9

94 BATTERY
93 CIRCUIT BOARD A
92 FERRITE COIL A
91 BATTERY-MOUNTED DEVICE
95 FERRITE COIL C
97 DRIP-PROOF MEASURE
92 BATTERY POWER FEEDER
96 CIRCUIT BOARD C

FIG. 10

INITIALIZATION PROCESSING
8-2 EXECUTE POWER FEEDING MODE IN WIRELESS POWER FEEDING STANDBY STATE
8-3 PERFORM WIRELESS POWER FEEDING PROCESSING IN LOW-VOLTAGE DRIVING STATE
8-4 IS THERE REACTION IN SENSOR?
8-5 PERFORM SWITCHING TO NORMAL WIRELESS POWER FEEDING MODE
8-6 PERFORM SWITCHING TO WIRELESS POWER RECEPTION MODE
8-7 PERFORM WIRELESS POWER RECEPTION PROCESSING
8-8 IS THERE REACTION IN SENSOR?
8-10 PERFORM WIRELESS POWER RECEPTION PROCESSING
8-11 IS THERE REACTION IN SENSOR?
8-12 PERFORM BATTERY CHARGING PROCESSING
8-13 PERFORM WIRELESS POWER FEEDING PROCESSING IN HIGH-VOLTAGE DRIVING STATE
8-14 PERFORM ABNORMALITY DETECTION PROCESSING
8-15 PERFORM DETERMINATION OF TARGET OBJECT?
8-17 PERFORM WIRELESS POWER FEEDING PROCESSING IN HIGH-VOLTAGE DRIVING STATE
8-18 IS THERE REACTION IN SENSOR?

FIG. 11

POWER FEEDER
GROOVE
BATTERY CHARGING DEVICE

FIG. 12

BATTERY POWER FEEDER
10-1 START COMMUNICATION PROCESSING
10-2 PERFORM POLLING COMMUNICATION IN COMMUNICATION TRANSMISSION PROCESSING
10-3 AWAIT FOR COMMUNICATION RECEPTION
10-4 PERFORM COMMUNICATION RECEPTION PROCESSING
10-5 DETERMINE WHETHER OR NOT BATTERY IS FULLY CHARGED?
10-6 CHANGE RED LIGHT TO GREEN LIGHT IN LED BATTERY-MOUNTED MAIN BODY PORTION
10-7 PERFORM COMMUNICATION RECEPTION PROCESSING
10-8 IS THERE COMMUNICATION?
10-9 MEASURE BATTERY CAPACITY
10-10 PERFORM PROCESSING OF TRANSMITTING BATTERY CAPACITY VALUE AS RESPONSE

What is claimed is:
1. A composite wireless power feeding system comprising:
a wireless charging system, the wireless charging system having a power feeding coil, and a power feeding circuit unit supplying power to cause the power feeding coil to generate electromagnetic waves;

a wireless power system including
a power reception and feeding coil,
a power circuit unit coupled to the power reception and feeding coil and selectively configured as a power feeding circuit to supply power to the power reception and feeding coil to generate electromagnetic waves, the power circuit unit being selectively configured as a power storage circuit to recover energy induced in the power reception and feeding coil responsive to the power reception and feeding coil being proximate to the power feeding coil and receipt of electromagnetic waves emitted from the power feeding coil, and
a battery coupled the power circuit unit for storing the energy recovered from the power reception and feeding coil; and
an energy consumption circuit unit configured for receiving energy from the power circuit unit, the energy consumption circuit unit including a power reception coil coupled to an energy consumption circuit for receipt of electric energy by electromagnetic induction using a phenomenon in which the power reception and feeding coil and the power reception coil resonate at a predetermined resonance frequency,
wherein the battery functions as a power source that powers the power reception and feeding coil to generate electromagnetic waves, the power circuit unit switching between a power feeding mode and a power reception mode responsive to operation of a mode switching means,
where the power feeding mode is activated by the mode switching means, the power circuit unit is activated and outputs electromagnetic waves from the power reception and feeding coil in proximity to the power reception coil to supply energy to the energy consumption circuit unit, and
where the power reception mode is activated by the mode switching means, the power circuit unit is activated and receives energy induced in the power reception and feeding coil to charge the battery by electromagnetic waves emitted from the power feeding coil disposed in proximity to the power reception and feeding coil, and wherein
the power reception and feeding coil, the battery, the power circuit unit, and the mode switching means are integrally configured as a battery-mounted device,
the power reception coil, and the energy consumption circuit unit are integrally configured as a terminal consumption unit,
each of a plurality of types of the terminal consumption units includes a plurality of types of the energy consumption circuit units having different functions, and is replaceable with respect to a releasable coupling with the battery-mounted device, and
the terminal consumption unit and the battery-mounted device are connected and an electrical coupling portion is not exposed to an ambient environment thereof.

2. The wireless power feeding system according to claim 1, wherein
the energy consumption circuit unit is a circuit that converts electric energy into light, and
the terminal consumption unit is configured as a light unit having a plurality of functions.

3. The wireless power feeding system according to claim 1, further comprising
an engaging portion at which the energy consumption circuit unit and the battery-mounted device are engaged so that the power reception coil of the energy consumption circuit unit and the power reception and feeding coil of the battery-mounted device are in close proximity with each other, wherein
the engaging portion is an engaging portion that is devoid of a direct electrical coupling portion and has a waterproof configuration,
the power circuit unit further includes a control circuit, and
the control circuit detects a proximity state between the power reception and feeding coil of the battery-mounted device and the power reception coil of the energy consumption circuit unit, and responsive thereto continuously supplies high energy to the energy consumption circuit unit.

4. The wireless power feeding system according to claim 1 or 2, further comprising
an engaging portion at which the energy consumption circuit unit and the battery-mounted device are engaged so that the power reception coil of the energy consumption circuit unit and the power reception and feeding coil of the battery-mounted device are in close proximity with each other, wherein
the engaging portion is an engaging portion that is devoid of a direct electrical coupling portion and has a waterproof configuration,
the power circuit unit further includes a control circuit,
the energy consumption circuit unit and the battery-mounted device are further provided with a magnet and a magnet switch, respectively, and
the control circuit detects a proximity state between the power reception coil of the energy consumption circuit unit and the power reception and feeding coil of the battery-mounted device responsive to an output of the magnet switch, and continuously supplies high energy to the energy consumption circuit unit based on the proximity state.

5. The wireless power feeding system according to claim 2, further comprising
an engaging portion at which the energy consumption circuit unit and the battery-mounted device are engaged so that the power reception coil of the energy consumption circuit unit and the power reception and feeding coil of the battery-mounted device are in close proximity to each other, wherein
the engaging portion is an engaging portion that is devoid of a direct electrical coupling portion and has a waterproof configuration,
the power circuit unit further includes a control circuit, the control circuit detects a proximity state between the power reception and feeding coil of the battery-mounted device and the power reception coil of the energy consumption circuit unit, and responsive thereto continuously supplies high energy to the energy consumption circuit unit.

6. The wireless power feeding system according to claim 3 or 5, wherein
the terminal consumption unit is a circuit that converts electric energy into light, has a rotation portion so that a direction of the light emitted from the terminal consumption unit is freely changeable in a state in which the battery-mounted device and the terminal consumption unit are engaged with each other, and has a function of detecting a rotation direction or a rotation position of the rotation portion by the power reception circuit, and the control circuit of the battery-mounted device controls supply of electric energy via the power reception and feeding coil according to the rotation direction or the rotation position to change an intensity or color of the light or perform switching between lighting and blinking.

7. The wireless power feeding system according to claim 3 or 5, wherein circuits related to the power feeding mode of the power circuit unit further include:

a resonant capacitor whose resonance frequency is adjusted so as to form a parallel resonant circuit with the power reception and feeding coil;

a switching circuit that periodically repeats activation (driving state) and deactivation (resonance state) of supplying power to the power reception and feeding coil;

a frequency adjustment circuit that changes a frequency of power being supplied to the power reception and feeding coil; and a resonance state sensor that detects a resonance state of the power reception and feeding coil and outputs a detection signal to the frequency adjustment circuit and the control circuit, and wherein the control circuit 1) integrally controls both the switching circuit and the frequency adjustment circuit, 2) determines a frequency and a driving time of power feeding responsive to on output of the resonance state sensor to achieve an optimum resonance frequency and a stable resonance state, and controls the switch circuit and the frequency adjustment circuit in correspondence with the frequency and the driving time, and 3) where an abnormal state, including an abnormal resonance state, or an abnormal discharge state, or an elevated temperature, or an overvoltage, or an overcurrent is detected, the control circuit stops feeding power to the power reception and feeding coil.

8. The wireless power feeding system according to claim 3 or 5, wherein the mode switching means switches the power feeding mode into a standby state responsive to the battery-mounted device and the terminal consumption unit not being engaged or an engaged state not being sensed, and performs switching from the power feeding mode in the standby state to the power reception mode when the engaged state is sensed.

9. The wireless power feeding system according to any one of claims 1, 2, 3, and 5, wherein the mode switching means includes 1) the power reception and feeding coil that receives the electromagnetic waves emitted from the power feeding coil by electromagnetic induction in the power reception mode, and 2) the power reception circuit unit that receives energy generated in the power reception and feeding coil, and the mode switching means performs switching from the power reception mode to the power feeding mode in a standby state responsive to a failure to reach a predetermined power reception level.

10. The wireless power feeding system according to any one of claims 1, 2, 3, and 5, wherein each of the power reception and feeding coil of the battery-mounted device, the power feeding coil, and the power reception coil is a pot type ferrite core in which a cylindrical portion surrounding a winding portion, a shaft portion of the winding portion, and one bottom surface of the cylindrical portion are formed of ferrite, in the power feeding mode, the power reception and feeding coil of the battery-mounted device and the power reception coil are engaged around a core hole and are arranged so as to face each other on a side where the ferrite bottom surface is not provided, and in the power reception mode, the power reception and feeding coil of the battery-mounted device and the power feeding coil are engaged around the core hole and are arranged so as to face each other on the side where the ferrite bottom surface is not provided.

11. The wireless power feeding system according to any one of claims 1, 2, 3, and 5, further comprising bidirectional communication means, wherein during power reception or feeding in the power reception mode or the power feeding mode, the bidirectional communication means enables bidirectional data communication, the bidirectional communications includes:

a numerical value of a state of charge of the battery communicated to a counterpart by the communication means, the state of charge of the battery being detected by a control unit of the power circuit unit, and a numerical value of an energy consumption amount is communicated to the battery-mounted device by the communication means, the energy consumption amount being recorded by the energy consumption unit.

12. The wireless power feeding system according to claim 3 or 5, wherein one of the battery-mounted device or the terminal consumption unit is further provided with 1) an LED light and a small-capacity backup battery, and 2) a light emitting unit formed of a luminous material that facilitates mutual device recognition is further provided, and responsive to an engaged state between the battery-mounted device and the terminal consumption unit being released, the LED light emits light for a certain period of time to facilitate replacement of the terminal consumption unit.

* * * * *